United States Patent [19]
Dawson et al.

[11] 4,134,831
[45] Jan. 16, 1979

[54] METHOD FOR LAKE RESTORATION

[75] Inventors: Gaynor W. Dawson, Richland; Basil W. Mercer, Pasco, both of Wash.

[73] Assignee: Battelle Memorial Institute, Richland, Wash.

[21] Appl. No.: 766,535

[22] Filed: Feb. 7, 1977

[51] Int. Cl.² .............................................. C02B 1/16
[52] U.S. Cl. ........................................ 210/33; 210/36; 210/37 R; 210/37 B; 210/38 C; 210/40; 252/301.1 W; 299/8; 423/7
[58] Field of Search .................. 210/24, 30 R, 32, 33, 210/36, 37 R, 38 R, 38 C, 40, 66, 170, 222, 223, 282, 502, 503, 37 B; 214/114; 294/65.5; 335/285; 252/301.1 W; 299/8; 423/7, 304

[56] References Cited

U.S. PATENT DOCUMENTS

| | | | |
|---|---|---|---|
| 1,212,870 | 1/1917 | Zolper | 294/65.5 |
| 2,214,925 | 9/1940 | Gutrie | 210/282 |
| 2,605,090 | 7/1952 | Jacobsen | 299/8 |
| 2,642,514 | 6/1953 | Herkenhoff | 210/24 |
| 2,932,555 | 4/1960 | Weiss et al. | 210/38 C |
| 3,210,121 | 10/1965 | Struven | 299/8 |
| 3,332,737 | 7/1967 | Kraus | 210/24 R |
| 3,505,213 | 4/1970 | Anthony et al. | 210/170 |
| 3,560,378 | 2/1971 | Weiss et al. | 210/33 |
| 3,579,322 | 5/1971 | Higgins | 210/24 |
| 3,607,740 | 9/1971 | Akeroyd | 210/33 |
| 3,657,119 | 4/1972 | Turbeville | 210/36 |
| 3,730,886 | 5/1973 | Ahrland et al. | 210/37 R |
| 3,803,033 | 4/1974 | Sutherland | 210/40 |
| 3,975,266 | 8/1976 | Baize | 210/66 |
| 4,039,445 | 8/1977 | Heide et al. | 210/38 C |
| 4,042,498 | 8/1977 | Kennedy | 210/40 |

FOREIGN PATENT DOCUMENTS 406015  11/1973  U.S.S.R. .................................... 299/8

Primary Examiner—Charles N. Hart
Assistant Examiner—Ivars Cintins
Attorney, Agent, or Firm—Klarquist, Sparkman, Campbell, Leigh, Hall & Whinston

[57] ABSTRACT

A process for removing pollutants or minerals from lake, river or ocean sediments or from mine tailings is disclosed. Magnetically attractable collection units containing an ion exchange or sorbent media with an affinity for a chosen target substance are distributed in the sediments or tailings. After a period of time has passed sufficient for the particles to bind up the target substances, a magnet drawn through the sediments or across the tailings retrieves the units along with the target substance.

19 Claims, 3 Drawing Figures

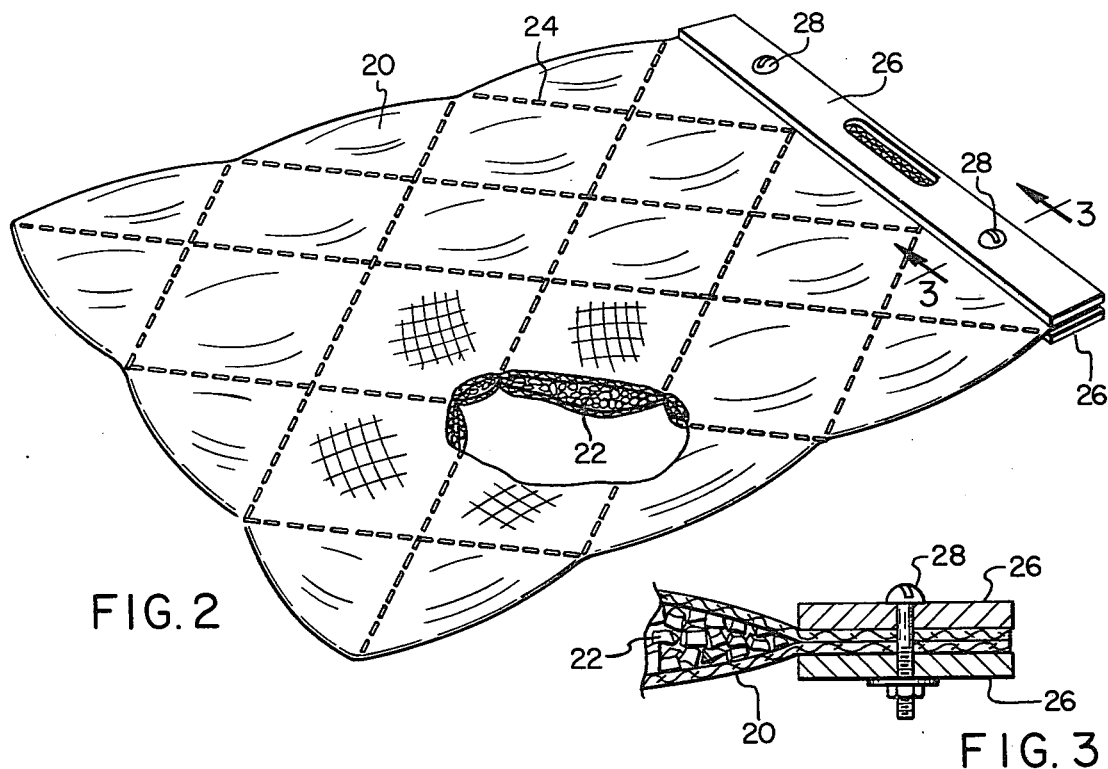
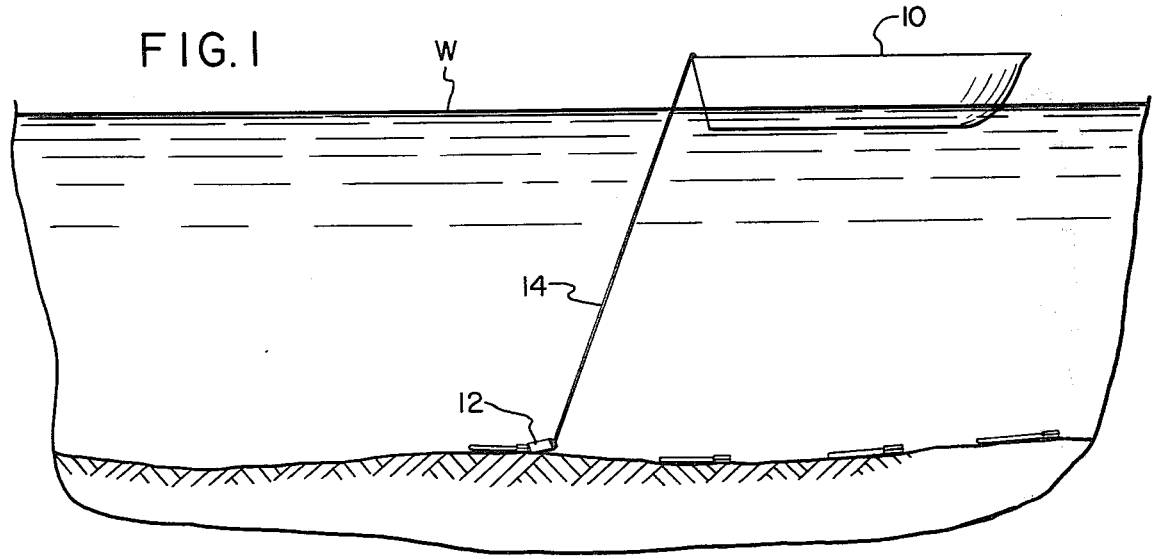

METHOD FOR LAKE RESTORATION

BACKGROUND OF THE INVENTION

The present invention relates to the removal of substances from sediments or mine tailings which are exposed to water. More specifically, it relates to the in situ restoration of contaminated lake, river or ocean sediments, to underwater mining and to the recovery of minerals and/or pollutants from mine tailings.

It is now generally recognized that in situ techniques for the restoration of contaminated lake and river sediments are less environmentally destructive than methods which require the dredging of the sediments. According to previous methods for in situ restoration of such sediments, media are added to lake sediments for the purpose of binding up the target pollutants and thereby reducing their impact on the overall chemical composition of the sediment. In the case of eutrophying lakes where excessive amounts of phosphate are present in the sediments, coagulants such as alum are added to bind the phosphate ions in insoluble metal salts. Similarly, it has been suggested that scrap iron added to lake sediments would bind mercury and thus decrease the potential for methylation.

Even though such binding procedures reduce the impact of the target pollutants they are not entirely satisfactory because they do not eliminate the contaminents from the water bodies. Since neither the pollutants nor the binding media are removed from the sediments, total pollutant content continues to increase even though a portion of pollutant may be bound up. Changes in water quality or the surrounding chemical environment can lead to the re-release of the bound up pollutant thus returning the water body to its original contaminated condition or worse. Also, the binding compounds become a permanent part of the water chemistry and thus alter the environment by their presence.

Underwater mining procedures are often similar to lake restoration procedures and subject to similar environmental restrictions. The dredging of sediments from river bottoms and even from sites on the ocean floor is a controversial and sometimes prohibited procedure. Environmentally safe methods for the recovery of metals and other substances from these sediments are widely sought after; but as yet few have been found.

Large piles of mine tailings are present in numerous locations throughout the world. In many instances these are exposed to the elements and thus subject to repeated washings with rain water. Many tailings contain water-soluble substances which are environmentally hazardous. Rainwater run-off from such tailings thus may transport the hazardous substances great distances from the location of the tailing pile, and may also disperse valuable water-soluble minerals which could have been recovered from the tailings. Heretofore no effective method of recovering water-soluble substances from the rainwater run-off of a mine tailings pile has been disclosed.

SUMMARY OF THE INVENTION

The present invention overcomes the difficulties of prior art underwater mining and water body restoration proposals and provides a new and effective method of removing water-soluble substances from the rainwater run-off of mine tailing piles.

The process of the present invention is especially advantageous as compared to prior in situ methods, for the restoration of polluted water bodies. This is because the present invention can be used to remove pollutants from almost any type of aqueous environment and because such pollutants are removed permanently so they cannot possibly be re-released to the environment at some future time.

According to the process of the present invention high density collection units, which include both a magnetically susceptible substance and a medium having an affinity for the target substance, are dispersed in the vicinity of the target substances. After a period of time sufficient to allow the target substance to dissolve in water (should it not already be dissolved), be carried to the collection units and thereafter to combine with the medium, the units are magnetically retrieved from the lake. In many instances the medium can be regenerated and the units subsequently put back into use. If the medium is regenerated, the target substance is separated from the media during the regeneration process. The target substance may subsequently be refined for use or, if of no commercial value, disposed of in a suitable manner.

It is an object of this invention to provide a method of removing pollutants from water body sediments without dredging.

It is a further object to bind pollutants in lake sediments on magnetically retrievable collection units so that both the pollutant and the units can be removed from the lake environment.

It is an additional object of the invention to recover metals and other valuable substances from the sediments of water bodies.

An additional object is to provide magnetically retrievable collection units which contain a medium to bind target substances in water bodies, which medium may be repeatedly regenerated and reused.

A still further object is to provide magnetically retrievable collection units which bind ions containing uranium thus preventing the migration of such ions in the rainwater runoff of uranium mine tailings.

Various other objects and advantages of this invention will become apparent to those skilled in the art upon reading the specification.

BRIEF DESCRIPTION OF THE DRAWING

In the drawing:

FIG. 1 is a schematic view of a vessel retrieving collection units from the sediments of a water body according to the process of the present invention;

FIG. 2 is a perspective view of a porous bag collection unit; and

FIG. 3 is a sectional view taken along lines 3—3 of FIG. 2.

DESCRIPTION OF THE PREFERRED EMBODIMENTS

According to the present invention, a site is identified at which a target substance is present in an aqueous environment; and an ion exchange or sorbent medium is chosen for its affinity for the target substance. The medium is processed to form collection units which are more dense than water and which are susceptible to a magnetic field. If macroscopic ferromagnetic debris, e.g. steel cans, etc., is located at the site, such debris is first removed by a magnetic collector. The chosen collection units are then deposited at the cleared site. The target substance, which must be at least partially water soluble, is transported by the water to a position adjacent the collection units so that the medium can act to bind the substance by adsorbtion, absorption or an ion exchange mechanism. The collection units and bound target substance are subsequently recovered from the aqueous environment by passing a magnetic probe therethrough to attract the units. The magnetic probe, with collection units adhering thereto, is then removed from the aqueous environment. The collection units are separated from the magnetic probe, and preferably the medium is regenerated so that the collection units may be used again. The target substance, separated from the medium during the regeneration process, is disposed of in any suitable fashion. If it has commercial value, the target substance may be further refined or sold. If the medium cannot be regenerated, it may be disposed of in an environmentally safe location. Loss of some residual collection units to the environment is of no concern since the media used are innocuous.

One specific use of the processes according to the present invention is the removal of pollutants from the sediments of lakes or rivers. In this application the collection units, which are of a greater density than water, are deposited in the sediments of the water body so that the media they contain can bind up a target pollutant in the sediments. After the passage of sufficient time, a vessel draws a magnetic probe through the sediments to attract and remove the collection of units from the sediments as described above. FIG. 1 illustrates the removal of collection units schematically. In this figure a boat 10 moves across the surface of a water body W at the deposition site. A magnet probe 12 is attached to one end of a cable 14 which trails from the boat 10. As the probe moves through the sediments at the bottom of the water body, it attracts the collection units which are thereafter removed from the sediments by hoisting the cable 14.

A second specific use of the present invention is the underwater mining of minerals in the sediments. The procedure is identical to the procedure for removing pollutants except that a resin or sorbent medium is chosen on the basis of its affinity for the target mineral.

A third specific use of the present invention is the removal of pollutants or minerals from the rainwater run-off of mine tailings. When used for this purpose, the collection units are seeded throughout the tailings. Next, rainwater dissolves the target substance and, as it moves through the tailing site, brings the target substance into contact with the collection units. The medium contained in the collection units binds up the target substance and thereby removes it from the run-off water. The collection units may be retrieved from time to time for regeneration of the media they contain. This may be accomplished, for example, by driving over the tailing piles in a terrestrial motor vehicle on which is mounted a large magnet to attract the collection units.

MEDIA

Choice of a medium for recovering a particular pollutant or mineral according to the process of the present invention depends, primarily, on the nature of the target substance and conditions within the aqueous environment. A wide variety of ion exchange and sorbent media, suitable for use according to the present invention, is available commercially. Many of the commercially available media are highly selective in that they will bind up certain substances in a fixed preferential sequence. Typical media which are suitable for binding specific pollutants are indicated in Table I. Other media, including those suitable for binding pollutants such as lead and selenium, are listed in chemical handbooks.

Table I

| Exchange/Sorbent Medium | Species Removed |
| --- | --- |
| Zirconium oxide | Phosphate, fluoride, arsenate, selenate, molybdate, other anions . . . |
| Aluminum oxide | Phosphate, fluoride, arsenate, selenate, molybdate, other anions . . . |
| Titanium oxide | Phosphate, fluoride, arsenate, selenate, molybdate, other anions . . . |
| Dowex A-1$_a$ | Mercury, cadmium |
| Seelex$_b$ | |
| Dowex 1$_a$ | Selenate, molybdate |
| Duolite A101$_c$ | |
| XAD 4$_d$ | Dissolved organics (PCBs, DDT, endrin, dieldrin) |
| XAD 7$_d$ | Dissolved organics (PCBs, DDT, endrin, dieldrin) |
| Activated carbon | Dissolved organics (PCBs, DDT, endrin, dieldrin, kepone) |
| Acid resins | Cations |
| Base resins | Anions |

$_a$Dow Chemical Co., Midland, Michigan.
$_b$Seekay Chemical Co., New York, New York.
$_c$Diamond Shamrock Chemical Corp., Cleveland, Ohio.
$_d$Rohm & Haas Co., Philadelphia, Pennsylvania.

In determining the suitability of a medium, first consideration should be given to the selectivity of that medium for the target species. As an example, zirconia and alumina are two media which are strongly selective for phosphate anions. These media are especially well suited when the processes of the present invention is used for lake restoration, because the presence of high phosphate ion concentrations is the driving force behind the eutrophication of lakes. Inorganic matrices of zirconia and alumina have a phosphate affinity because they contain $ROH_2^+$ sites which readily bind anions in an exchangeable manner. When a $PO_4^{-3}$ (phosphate) ion comes in contact with these $ROH_2^+$ sites, hydroxide ions are released and the phosphate ion is bound to the exchange medium. When a zirconium oxide medium is used, phosphate ions are removed from an aqueous solution according to the following general equation:

$$ZrO_2.2H_2O + PO_4^{-3} \rightarrow ZrOHPO_4 + 3OH^- \qquad (1)$$

A suitable zirconium oxide medium may be prepared by combining $ZrOCl_2$ and $NH_4OH$ aqueous solutions in a ratio such that the combined solution has a pH of 6. This usually occurs when the molar ratio of $ZrOCl_2$ to $NH_4OH$ is about 2:1. Other ratios are suitable, but optimum phosphate capacity has been obtained at about the 2:1 ratio. Hydrous zirconium oxide is thus formed in an aqueous solution according to the general equation:

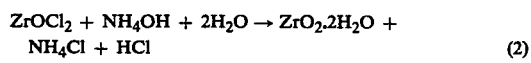

$$ZrOCl_2 + NH_4OH + 2H_2O \rightarrow ZrO_2.2H_2O + NH_4Cl + HCl \qquad (2)$$

The combined solutions form a gel which is vacuum filtered to remove most of the water and dissolved chlorides. The gel is subsequently dried and then divided into particles which have numerous $ROH_2^+$ sites and thus display the desired affinity for phosphate ions. Before the particles are used they may be washed with a NaOH solution to assure that there is no anion contamination of the zirconium oxide matrix.

To regenerate the zirconium medium after the collection units are removed from the lake, the medium is washed with a caustic solution which causes the $PO_4^{-3}$ ions to be replaced with hydroxide ions. Regeneration occurs according to the general equation:

$$ZrOHPO_4 + 3NaOH \rightarrow ZrO_2 \cdot 2H_2O + Na_3PO_4 \quad (3)$$

The sodium phosphate formed in the rinsing step is disposed of and the hydrous zirconium oxide is ready for reuse.

As another example, activated carbon and high surface polymeric adsorbents are selective for adsorbing organic substances, such as PCBs, DDT, endrin, dieldrin and kepone. Preferred media for removal of such organic pollutants include polymeric adsorbents having a surface area to weight ratio greater than one hundred square meters per gram, such as the above named XAD resins. Granules containing one or more of these adsorbent media and a magnetically susceptible substance are dispersed in the sediments of a water body containing the target organic pollutant. After a period of time sufficient for the adsorbent medium to bind up the pollutant, a magnet is drawn through the water to retrieve the granules. The magnet is thereafter withdrawn from the water body and the granules separated from the magnet. In some instances the pollutant can be removed from the medium so that the retrieved granules may be reused, e.g., hexane may be used to extract PCBs from an adsorbent medium. In other instances, where economics do not favor regeneration, the granules along with the bound organic pollutant may be disposed of in an environmentally safe location.

As previously stated, it is preferred that the medium chosen have the greatest possible affinity for the target substance. In order to determine which medium actually has the greatest affinity, it is sometimes necessary to take into account the nature of the aqueous environment, because the presence of substances, other than the target substance, may alter the effectiveness of a given medium and because the environment may alter the nature of the target substance itself.

For instance, if the present invention is used for the collection of uranium-bearing ions from the rainwater run-off of uranium mine tailings, it is necessary to determine the characteristic pH of the run-off water before selecting a medium. If the run-off water is basic, uranium is most likely present in the water as uranate anions. An anion exchanger, such as a base resin selective for uranate ions, would be a logical choice of medium under these circumstances. If, however, the run-off water is acidic, uranium is most likely present as uranyl cations. The medium chosen in this instance should be a cation exchanger, such as an acid resin selective for uranyl cations. If the rainwater run-off is not of a predictable pH, a mixture of both mediums may be used in order to bind up both of the uranium-bearing ion species.

COLLECTION UNITS

Collection units for use according to the process of the present invention may come in a variety of forms. One preferred collection unit is a magnetically attractable granule which contains the selected medium and which is susceptible to a magnetic field. Another preferred collection unit comprises a magnetically attractable porous bag which contains the medium.

A variety of methods may be used for making granule collection units. Preferably, particles of a ferromagnetic material, such as ground magnetite or iron filings, are combined with the preferred sorbent or ion exchange medium during formation of the units. Particles of natural magnetite are preferred because of magnetite's abundance, resistance to chemical reaction in most aqueous environments, and because of the tenacity of its magnetic properties.

Ferromagnetic particles may be incorporated into crystalline ion exchange resins, such as the previously described zirconium oxide resin, by mixing the particles with the resin while it is in a gelatinous state. The solid crystalline granules which remain after drying include both the resin and the magnetic particles. Magnetically attractable granules may also be formed by binding ferromagnetic particles to sorbent particles, such as activated carbon, by means of adhesives such as the silicate type, inorganic Carbon Coating Mix manufactured by Union Carbide Co., New York, New York.

Collection units of the porous bag type are made magnetically retrievable by adding an amount of ferromagnetic material inside the packet, or by attaching a plate of a ferromagnetic material such as iron to the outside of the packet.

One embodiment of such a bag type collection unit is the packet shown in FIGS. 2 and 3 of the accompanying drawing. In this embodiment a porous fiber bag 20 is used to contain the medium 22. Preferably the bag is shaped to allow maximum circulation of water through the medium. In the illustrated embodiment maximum circulation is accomplished by the use of stitching 24 which maintains the bag 20 substantially flat and which separates the media into multiple small compartments to maximize exposed media surface area. The illustrated packet is made magnetically attractable by the presence of a ferromagnetic plate 26 clamped onto the open end of the bag 20 by means of bolts 28. Alternatively, a ferromagnetic plate could be secured to the bag by another suitable means or be included inside one of the compartments defined by the stitching 24; or ground magnetite could be mixed with the medium in the compartments.

In most instances, granules are the preferred collection unit because they bring the medium into direct contact with the water and thus are most efficient in the removal of target substances from the water. In some instances, however, the preferred medium cannot be readily combined with magnetic material to form granules. Such is the case when the preferred medium is zeolite or some other natural resin. In such cases it is preferable to use bag type units. The size of the mesh used in the porous fiber bags is determined by the size of medium particles which the bags are to include. By experimentation a person skilled in the art can determine which mesh size and media particle size are most efficient for the removal of target substances from any given aqueous environment.

EXAMPLE I

Magnetically retrievable phosphate selective ion exchange collection units of the granule type were produced from approximately 1 liter of a 0.2M zirconium chloride solution by adding a sufficient amount of a 25 percent ammonium hydroxide solution to bring the combined solution to a pH of 6. This mixture formed a gelatinous precipitate to which was added about 100 grams of finely ground natural magnetite particles. The resulting gel was vacuum filtered and then dried at 105° C. in a drying oven. After drying, a crystalline cake of zirconium oxide matrix was removed from the oven and immersed in water where it fractured into dull gray crystalline granules of various sizes. Prior to use the granules were washed in a caustic solution.

To test the particulate material's ability to remove phosphate from the sediments of a lake, two identical 3-liter beakers were charged with 1250 mls. of dredged sediments from the Scootnai Reservoir in eastern Washington State and then filled to the top with tap water. The granules were added to one of the two containers. Supernate water from the two aquaria was circulated through activated alumina columns and returned to the beakers at a rate of one milliliter per minute. The columns acted as repositories for any phosphate released to the water and thus accumulated solubilized phosphate in amounts proportional to the phosphate released from the sediments just as an expanding bloom of phytoplankton would be in a natural system.

The aquaria were operated for 20 days after which five column volumes of 1M NaOH was employed to strip accumulated phosphate from the alumina in each column. The resulting solutions were neutralized and analyzed for ortho and total phosphate content. Whereas five milligrams of ortho phosphate and seven milligrams total phosphate were collected from the untreated aquarium only 0.13 milligrams of ortho and 0.25 milligrams total phosphate were collected from the treated system. A bar magnet was successfully used to separate the granules from the sediments. The zirconium oxide medium was regenerated by rinsing the granules with a caustic solution whereby phosphate ions in the matrix were replaced by hodroxide ions. The granules containing the regenerated medium were thus suitable for reuse.

EXAMPLE 2

Aquarium tests were conducted to determine whether the process of the present invention could be used for the recovery of PCB's from contaminated river sediments. In each of the tests a thin layer of adsorbent media was deposited over PCB-containing river sediments in each of several tanks under identical conditions. PCB content of the sediments was measured after one week and again at the end of four weeks. The results of this test are summarized in Table 2.

Table 2

| Medium | PCB content (ppm) | |
|---|---|---|
| | 1 week | 4 weeks |
| Carbon | .9 | .5 |
| XAD-7[a] | .8 | .3 |
| XAD-4[a] | .9 | <.1 (detection limit) |
| None[a] | 2.4 | 2.0 |

[a]Rohm & Haas Co., Philadelphia, Pennsylvania

As is clear from this table, substantial reductions in PCB levels and achieved in a short period of time by using media which can readily be combined with magnetically susceptible materials. Although the XAD resins listed are costly, they may become preferred for removal of PCB's because the present invention provides a means for their recovery and regeneration so that they may be reused numerous times.

While we have shown and described the preferred embodiments of our invention, it will be apparent to those skilled in the art that changes and modifications may be made without departing from our invention in its broader aspects.

We claim:

1. A method of removing a target substance from naturally occurring sediments in an aqueous environment in situ comprising the steps of:
   dispersing collection units having a density greater than water in said sediments without substantial agitation of said sediments, each of said units comprising a medium having an affinity for said target substance, whereby said target substance will be bound to said units, and a magnetically susceptible substance;
   collecting said units without substantial agitation of said sediments by attracting said units to a magnetic collection device while in said aqueous environment; and
   removing said collection device and the collected units attracted thereto from said aqueous environment.

2. A method according to claim 1 wherein:
   said medium comprises an ion exchange medium; and
   said target substance comprises an ionic substance for which said ion exchange medium has an affinity.

3. A method according to claim 2 wherein:
   said ionic exchange medium comprises a matrix of zirconium oxide.

4. A method according to claim 2 wherein:
   said magnetically susceptible substance comprises ground magnetite;
   said ion exchange medium comprising a synthetic ion exchange resin; and
   said units are formed by mixing said ground magnetite with the ingredients of said resin and then allowing said mixture to solidify.

5. A method according to claim 1 wherein:
   said collecting comprises drawing a magnet along said sediments so that said units adhere to said magnet; and
   said removing comprises withdrawing said magnet, with said units adhering thereto, from said aqueous environment.

6. A method according to claim 1 further comprising:
   separating said target substance from said units after said removing; and
   regenerating said medium for reuse.

7. A method according to claim 1 wherein said magnetically susceptible substance comprises ground magnetite.

8. A method according to claim 1 wherein said medium comprises a sorbent medium.

9. A method according to claim 1 wherein said units further comprise porous bags containing said medium.

10. A method according to claim 9 wherein said magnetically susceptible substance comprises ground magnetite contained within said bags.

11. A method according to claim 9 wherein said magnetically susceptible substance comprises metal plates, each of said bags containing at least one of said plates.

12. A method according to claim 9 wherein said magnetically susceptible substance comprises metal plates, each of said bags having at least one of said plates mounted thereon.

13. A method according to claim 1 wherein said units comprise granules each of which contains said medium and said magnetically susceptible substance.

14. A method of removing phosphate ions from naturally occurring sediments in a body of water in situ comprising the steps of:
   dispersing granules containing a zirconium oxide matrix and ground magnetite in the sediments of the body of water without substantial agitation of said sediments, whereby said phosphate ions will be bound to said matrix;

collecting said granules without substantial agitation of said sediments by drawing a magnet through the water after said phosphate ions are bound to said matrix;

withdrawing said magnet from the water so that said granules and said bound phosphate ions are removed from the water; and rinsing said granules with a caustic solution to separate the phosphate ions from said matrix and to regenerate said matrix for reuse.

15. A method of removing PCB's from naturally occurring sediments in a body of water in situ comprising the steps of:

dispersing granules containing a magnetically susceptible substance and a binding medium selected from the group consisting of high surface area polymeric absorbents and activated carbon, in the sediments of said body of water without substantial agitation of said sediments, whereby said PCB's will be bound to said medium;

collecting said granules without substantial agitation of said sediments by drawing a magnet through the water after said PCB's are bound to said medium; and withdrawing said magnet from the water so that said granules and said bound PCB's are removed from the water.

16. A method according to claim 15:

wherein said medium comprises activated carbon; and further comprising disposing of said carbon and said bound PCB's in an environmentally safe location.

17. A method according to claim 15 further comprising:

separating said granules from said magnet; and regenerating said granules for reuse by separating said PCB's therefrom;

said medium comprising a high surface area polymeric adsorbent having a surface area to weight ratio greater than one hundred square meters per gram.

18. A method for removing uranium-containing ions from the rainwater run-off of uranium tailing piles in situ to prevent the contamination of adjacent natural waterbodies comprising the steps of:

dispersing collection units containing a magnetically susceptible substance and a binding medium selected from the group consisting of ion exchange resins attractive to uranate ions, ion exchange resins attractive to uranyl ions, and mixtures thereof, in uraium ore tailings piles which are exposed to ambient weather conditions, whereby said uranium-containing ions will be bound to said medium;

collecting said units by drawing a magnet over the tailing piles after said uranium-containing ions are bound to said medium; and withdrawing said magnet from the tailing piles so that said units and said bound uranium-containing ions are removed from said rainwater run-off.

19. A method for underwater mining of a mineral from the naturally occurring sediments in a body of water in situ comprising the steps of:

dispersing collection units, containing a magnetically susceptible substance and a medium having an affinity for the mineral to be mined, in the sediments of said body of water without substantial agitation of said sediments, whereby said minerals will be bound to said medium;

collecting said units without substantial agitation of said sediments by drawing a magnet through the water after said mineral is bound to said medium;

withdrawing said magnet from the water so that said units and said mineral are removed from the water;

separating said mineral from said units; and subsequently regenerating said medium for reuse.

* * * * *